United States Patent
Berkovitz et al.

(10) Patent No.: US 12,278,840 B1
(45) Date of Patent: Apr. 15, 2025

(54) EFFICIENT REPRESENTATION OF MULTIPLE CLOUD COMPUTING ENVIRONMENTS THROUGH UNIFIED IDENTITY MAPPING

(71) Applicant: Wiz, Inc., New York, NY (US)

(72) Inventors: Avihai Berkovitz, Tel Aviv (IL); George Pisha, Giv'atayim (IL); Yaniv Joseph Oliver, Tel Aviv (IL); Udi Reitblat, Tel Aviv (IL)

(73) Assignee: Wiz, Inc., New York, NY (US)

( * ) Notice: Subject to any disclaimer, the term of this patent is extended or adjusted under 35 U.S.C. 154(b) by 235 days.

(21) Appl. No.: 17/654,668

(22) Filed: Mar. 14, 2022

Related U.S. Application Data

(60) Provisional application No. 63/222,709, filed on Jul. 16, 2021.

(51) Int. Cl.
*G06F 21/00* (2013.01)
*H04L 9/40* (2022.01)

(52) U.S. Cl.
CPC .............. *H04L 63/20* (2013.01); *H04L 63/10* (2013.01); *H04L 63/1433* (2013.01)

(58) Field of Classification Search
None
See application file for complete search history.

(56) References Cited

U.S. PATENT DOCUMENTS

| | | |
|---|---|---|
| 6,910,132 B1 | 6/2005 | Bhattacharya |
| 7,627,652 B1 | 12/2009 | Commons et al. |
| 7,784,101 B2 | 8/2010 | Verbowski et al. |

(Continued)

FOREIGN PATENT DOCUMENTS

| | | |
|---|---|---|
| EP | 4160983 A1 | 4/2023 |
| EP | 4254869 A2 | 10/2023 |

(Continued)

OTHER PUBLICATIONS

Ali Gholami; Security and Privacy of Sensitive Data in Cloud Computing: a Survey of Recent Developments; ARIX:2016; pp. 131-150.

(Continued)

*Primary Examiner* — Christopher B Robinson
(74) *Attorney, Agent, or Firm* — M&B IP Analysts, LLC

(57) ABSTRACT

A system and method for generating a security graph utilizing a unified model based on multiple cloud environments are provided. The method includes receiving data from a first cloud environment pertaining to: resources, principals, and permissions; generating for each resource a corresponding resource node in the security graph, the corresponding resource node including an identifier of the resource, wherein the resource is a cloud entity deployed in the first cloud environment; generating for each principal a corresponding principal node in the security graph, the corresponding principal node including an identifier of the principal, wherein the principal is a cloud entity in the first cloud environment that generates an operation request in the first cloud environment; and generating a connection between at least a principal node and at least a resource node in the security graph, in response to detecting a permission indicating that a principal can access a resource.

20 Claims, 8 Drawing Sheets

(56) References Cited

U.S. PATENT DOCUMENTS

| | | |
|---|---|---|
| 8,200,965 B2 | 6/2012 | Fujibayashi et al. |
| 8,352,431 B1 | 1/2013 | Protopopov et al. |
| 8,412,688 B1 | 4/2013 | Armangau et al. |
| 8,413,239 B2 | 4/2013 | Sutton |
| 8,417,967 B2 | 4/2013 | Foster et al. |
| 8,499,354 B1 | 7/2013 | Satish et al. |
| 8,595,822 B2 | 11/2013 | Schrecker et al. |
| 8,701,200 B2 | 4/2014 | Naldurg et al. |
| 8,789,049 B2 | 7/2014 | Hutchins et al. |
| 8,813,234 B1 | 8/2014 | Bowers et al. |
| 8,898,481 B1 | 11/2014 | Osburn et al. |
| 8,914,406 B1 | 12/2014 | Haugsnes |
| 9,009,836 B1 | 4/2015 | Yarykin et al. |
| 9,094,379 B1 | 7/2015 | Miller |
| 9,119,017 B2 | 8/2015 | Sinha |
| 9,165,142 B1 | 10/2015 | Sanders et al. |
| 9,172,621 B1* | 10/2015 | Dippenaar .......... H04L 41/0879 |
| 9,185,136 B2 | 11/2015 | Dulkin et al. |
| 9,330,273 B2 | 5/2016 | Khetawat et al. |
| 9,369,433 B1 | 6/2016 | Paul |
| 9,419,996 B2 | 8/2016 | Porat |
| 9,438,634 B1 | 9/2016 | Ross et al. |
| 9,467,473 B2 | 10/2016 | Jayaraman |
| 9,544,327 B1 | 1/2017 | Sharma et al. |
| 9,563,385 B1 | 2/2017 | Kowalski et al. |
| 9,569,328 B2 | 2/2017 | Pavlov et al. |
| 9,582,662 B1 | 2/2017 | Messick et al. |
| 9,596,235 B2 | 3/2017 | Badam et al. |
| 9,607,104 B1 | 3/2017 | Turner et al. |
| 9,646,172 B1 | 5/2017 | Hahn |
| 9,661,009 B1 | 5/2017 | Karandikar et al. |
| 9,672,355 B2 | 6/2017 | Titonis et al. |
| 9,712,503 B1 | 7/2017 | Ahmed |
| 9,892,261 B2 | 2/2018 | Joram et al. |
| 10,002,247 B2 | 6/2018 | Suarez et al. |
| 10,032,032 B2 | 7/2018 | Suarez et al. |
| 10,135,826 B2 | 11/2018 | Reddy |
| 10,229,125 B2 | 3/2019 | Goodman et al. |
| 10,255,370 B2 | 4/2019 | Carpenter et al. |
| 10,360,025 B2 | 7/2019 | Foskett et al. |
| 10,412,103 B2 | 9/2019 | Haugsnes |
| 10,412,109 B2 | 9/2019 | Loureiro et al. |
| 10,459,664 B1 | 10/2019 | Dreier et al. |
| 10,536,471 B1 | 1/2020 | Derbeko et al. |
| 10,540,499 B2 | 1/2020 | Wailly et al. |
| 10,552,610 B1 | 2/2020 | Vashisht et al. |
| 10,554,507 B1 | 2/2020 | Siddiqui et al. |
| 10,567,468 B2 | 2/2020 | Perlmutter |
| 10,572,226 B2 | 2/2020 | Biskup et al. |
| 10,574,675 B2 | 2/2020 | Peppe et al. |
| 10,623,386 B1 | 4/2020 | Bernat et al. |
| 10,630,642 B2 | 4/2020 | Clark et al. |
| 10,664,619 B1 | 5/2020 | Marelas |
| 10,691,636 B2 | 6/2020 | Tabaaloute et al. |
| 10,721,260 B1 | 7/2020 | Schlarp et al. |
| 10,725,775 B2 | 7/2020 | Suarez et al. |
| 10,735,430 B1 | 8/2020 | Stoler |
| 10,735,442 B1 | 8/2020 | Swackhamer |
| 10,791,138 B1 | 9/2020 | Siddiqui et al. |
| 10,803,188 B1 | 10/2020 | Rajput et al. |
| 10,831,898 B1 | 11/2020 | Wagner |
| 10,915,626 B2 | 2/2021 | Tang et al. |
| 10,924,503 B1 | 2/2021 | Pereira et al. |
| 10,972,484 B1 | 4/2021 | Swackhamer |
| 10,997,293 B2 | 5/2021 | Wiest et al. |
| 11,005,860 B1 | 5/2021 | Glyer et al. |
| 11,016,954 B1 | 5/2021 | Babocichin et al. |
| 11,044,118 B1 | 6/2021 | Reed et al. |
| 11,055,414 B2 | 7/2021 | Claes |
| 11,064,032 B1 | 7/2021 | Yang et al. |
| 11,099,976 B2 | 8/2021 | Khakare et al. |
| 11,102,231 B2 | 8/2021 | Kraning et al. |
| 11,165,652 B1 | 11/2021 | Byrne |
| 11,245,730 B2 | 2/2022 | Bailey |
| 11,271,961 B1 | 3/2022 | Berger et al. |
| 11,334,670 B2 | 5/2022 | Franco et al. |
| 11,366,897 B1 | 6/2022 | Ramanathan et al. |
| 11,388,183 B2 | 7/2022 | Hoopes et al. |
| 11,405,426 B2 | 8/2022 | Nguyen |
| 11,444,974 B1 | 9/2022 | Shakhzadyan et al. |
| 11,483,317 B1 | 10/2022 | Bolignano et al. |
| 11,496,498 B2 | 11/2022 | Wright et al. |
| 11,496,519 B1 | 11/2022 | Gupta et al. |
| 11,503,063 B2 | 11/2022 | Rao et al. |
| 11,507,672 B1 | 11/2022 | Pagnozzi et al. |
| 11,516,222 B1 | 11/2022 | Srinivasan et al. |
| 11,520,907 B1 | 12/2022 | Borowiec et al. |
| 11,546,360 B2 | 1/2023 | Woodford et al. |
| 11,556,659 B1 | 1/2023 | Kumar et al. |
| 11,558,401 B1 | 1/2023 | Vashisht et al. |
| 11,558,423 B2 | 1/2023 | Gordon et al. |
| 11,567,751 B2 | 1/2023 | Cosentino et al. |
| 11,570,090 B2 | 1/2023 | Shen et al. |
| 11,575,696 B1 | 2/2023 | Ithal et al. |
| 11,614,956 B2 | 3/2023 | Tsirkin et al. |
| 11,645,390 B2 | 5/2023 | Vijayvargiya et al. |
| 11,662,928 B1 | 5/2023 | Kumar et al. |
| 11,663,340 B2 | 5/2023 | Wu et al. |
| 11,669,386 B1 | 6/2023 | Abrol |
| 11,700,233 B2 | 7/2023 | St. Pierre |
| 11,750,566 B1 | 9/2023 | Montilla Lugo |
| 11,757,844 B2 | 9/2023 | Xiao |
| 11,770,398 B1 | 9/2023 | Erlingsson |
| 11,792,284 B1 | 10/2023 | Nanduri et al. |
| 11,799,874 B1 | 10/2023 | Lichtenstein et al. |
| 11,803,766 B1 | 10/2023 | Srinivasan |
| 11,841,945 B1 | 12/2023 | Fogel et al. |
| 11,914,707 B1 | 2/2024 | Ramanathan et al. |
| 11,922,220 B2 | 3/2024 | Haghighat et al. |
| 11,936,785 B1 | 3/2024 | Shemesh et al. |
| 12,019,770 B2 | 6/2024 | Nilsson et al. |
| 12,050,696 B2 | 7/2024 | Pieno et al. |
| 12,058,177 B2 | 8/2024 | Crabtree et al. |
| 2003/0188194 A1 | 10/2003 | Currie et al. |
| 2003/0217039 A1 | 11/2003 | Kurtz et al. |
| 2005/0050365 A1 | 3/2005 | Seki et al. |
| 2005/0251863 A1 | 11/2005 | Sima |
| 2005/0283645 A1 | 12/2005 | Turner et al. |
| 2007/0271360 A1 | 11/2007 | Sahita et al. |
| 2008/0075283 A1 | 3/2008 | Takahashi |
| 2008/0221833 A1 | 9/2008 | Brown et al. |
| 2008/0307020 A1 | 12/2008 | Ko et al. |
| 2009/0106256 A1 | 4/2009 | Safari et al. |
| 2009/0271863 A1 | 10/2009 | Govindavajhala et al. |
| 2010/0242082 A1 | 9/2010 | Keene et al. |
| 2010/0281275 A1 | 11/2010 | Lee et al. |
| 2011/0055361 A1 | 3/2011 | Dehaan |
| 2011/0276806 A1 | 11/2011 | Casper et al. |
| 2012/0110651 A1 | 5/2012 | Van Biljon et al. |
| 2012/0297206 A1 | 11/2012 | Nord et al. |
| 2013/0054890 A1 | 2/2013 | Desai et al. |
| 2013/0124669 A1 | 5/2013 | Anderson et al. |
| 2013/0160119 A1 | 6/2013 | Sartin |
| 2013/0160129 A1 | 6/2013 | Sartin |
| 2014/0096134 A1 | 4/2014 | Barak |
| 2014/0115578 A1 | 4/2014 | Cooper et al. |
| 2014/0237537 A1 | 8/2014 | Manmohan |
| 2014/0317677 A1 | 10/2014 | Vaidya |
| 2014/0337613 A1 | 11/2014 | Martini |
| 2015/0033305 A1 | 1/2015 | Shear |
| 2015/0055647 A1 | 2/2015 | Roberts et al. |
| 2015/0163192 A1 | 6/2015 | Jain et al. |
| 2015/0172321 A1 | 6/2015 | Kirti et al. |
| 2015/0254364 A1 | 9/2015 | Piduri et al. |
| 2015/0310215 A1 | 10/2015 | McBride et al. |
| 2015/0319160 A1 | 11/2015 | Ferguson et al. |
| 2016/0078231 A1 | 3/2016 | Bach et al. |
| 2016/0103669 A1 | 4/2016 | Gamage et al. |
| 2016/0105454 A1 | 4/2016 | Li et al. |
| 2016/0140352 A1 | 5/2016 | Nickolov |
| 2016/0156664 A1 | 6/2016 | Nagaratnam et al. |
| 2016/0224600 A1 | 8/2016 | Munk |
| 2016/0299708 A1 | 10/2016 | Yang et al. |
| 2016/0366185 A1 | 12/2016 | Lee et al. |

(56) References Cited

U.S. PATENT DOCUMENTS

| | | |
|---|---|---|
| 2017/0026416 A1 | 1/2017 | Carpenter et al. |
| 2017/0070506 A1 | 3/2017 | Reddy |
| 2017/0104755 A1 | 4/2017 | Arregoces |
| 2017/0111384 A1 | 4/2017 | Loureiro et al. |
| 2017/0185784 A1 | 6/2017 | Madou |
| 2017/0187743 A1 | 6/2017 | Madou |
| 2017/0223024 A1 | 8/2017 | Desai |
| 2017/0230179 A1 | 8/2017 | Mannan et al. |
| 2017/0237560 A1 | 8/2017 | Mueller et al. |
| 2017/0257347 A1 | 9/2017 | Yan |
| 2017/0285978 A1 | 10/2017 | Manasse |
| 2017/0034198 A1 | 12/2017 | Powers et al. |
| 2017/0374136 A1 | 12/2017 | Ringdahl |
| 2018/0004950 A1 | 1/2018 | Gupta et al. |
| 2018/0026995 A1 | 1/2018 | Dufour et al. |
| 2018/0027009 A1 | 1/2018 | Santos |
| 2018/0063290 A1 | 3/2018 | Yang et al. |
| 2018/0150412 A1 | 5/2018 | Manasse |
| 2018/0159882 A1 | 6/2018 | Brill |
| 2018/0181310 A1 | 6/2018 | Feinberg et al. |
| 2018/0191726 A1* | 7/2018 | Luukkala ............ H04L 63/1466 |
| 2018/0219888 A1 | 8/2018 | Apostolopoulos |
| 2018/0234459 A1 | 8/2018 | Kung |
| 2018/0239902 A1 | 8/2018 | Godard |
| 2018/0260566 A1 | 9/2018 | Chaganti et al. |
| 2018/0270268 A1 | 9/2018 | Gorodissky et al. |
| 2018/0278639 A1 | 9/2018 | Bernstein et al. |
| 2018/0288129 A1 | 10/2018 | Joshi et al. |
| 2018/0309747 A1 | 10/2018 | Sweet et al. |
| 2018/0321993 A1 | 11/2018 | McClory |
| 2018/0341768 A1 | 11/2018 | Marshall et al. |
| 2018/0359058 A1 | 12/2018 | Kurian |
| 2018/0359059 A1 | 12/2018 | Kurian |
| 2019/0007271 A1* | 1/2019 | Rickards ............ H04L 41/0894 |
| 2019/0043201 A1 | 2/2019 | Strong et al. |
| 2019/0058722 A1 | 2/2019 | Levin et al. |
| 2019/0068617 A1 | 2/2019 | Coleman et al. |
| 2019/0068627 A1 | 2/2019 | Thampy |
| 2019/0104140 A1 | 4/2019 | Gordeychik et al. |
| 2019/0116111 A1 | 4/2019 | Izard et al. |
| 2019/0121986 A1 | 4/2019 | Stopel et al. |
| 2019/0132350 A1 | 5/2019 | Smith et al. |
| 2019/0149604 A1 | 5/2019 | Jahr |
| 2019/0166129 A1 | 5/2019 | Gaetjen et al. |
| 2019/0171811 A1 | 6/2019 | Daniel et al. |
| 2019/0191417 A1* | 6/2019 | Baldemair ............ H04W 72/04 |
| 2019/0205267 A1 | 7/2019 | Richey et al. |
| 2019/0207966 A1 | 7/2019 | Vashisht et al. |
| 2019/0220575 A1 | 7/2019 | Boudreau et al. |
| 2019/0245883 A1 | 8/2019 | Gorodissky et al. |
| 2019/0260764 A1 | 8/2019 | Humphrey et al. |
| 2019/0278928 A1 | 9/2019 | Rungta et al. |
| 2019/0354675 A1 | 11/2019 | Gan et al. |
| 2019/0377988 A1 | 12/2019 | Qi et al. |
| 2020/0007314 A1 | 1/2020 | Vouk et al. |
| 2020/0007569 A1 | 1/2020 | Dodge et al. |
| 2020/0012818 A1 | 1/2020 | Levin et al. |
| 2020/0028862 A1 | 1/2020 | Lin |
| 2020/0044916 A1 | 2/2020 | Kaufman et al. |
| 2020/0050440 A1 | 2/2020 | Chuppala et al. |
| 2020/0082094 A1 | 3/2020 | McAllister et al. |
| 2020/0106782 A1 | 4/2020 | Sion |
| 2020/0125352 A1 | 4/2020 | Kannan |
| 2020/0145405 A1 | 5/2020 | Bosch et al. |
| 2020/0244678 A1 | 7/2020 | Shua |
| 2020/0244692 A1 | 7/2020 | Shua |
| 2020/0259852 A1* | 8/2020 | Wolff .................. H04L 67/10 |
| 2020/0320845 A1 | 10/2020 | Livny et al. |
| 2020/0336489 A1* | 10/2020 | Wuest .................. G06F 21/45 |
| 2020/0382556 A1* | 12/2020 | Woolward .......... G06F 16/9024 |
| 2020/0387357 A1 | 12/2020 | Mathon et al. |
| 2020/0389431 A1 | 12/2020 | St. Pierre |
| 2020/0389469 A1 | 12/2020 | Litichever et al. |
| 2020/0409741 A1 | 12/2020 | Dornemann et al. |
| 2021/0014265 A1 | 1/2021 | Hadar et al. |
| 2021/0026932 A1 | 1/2021 | Boudreau et al. |
| 2021/0042263 A1 | 2/2021 | Zdornov et al. |
| 2021/0089662 A1 | 3/2021 | Muniswamy-Reddy et al. |
| 2021/0105304 A1 | 4/2021 | Kraning et al. |
| 2021/0144517 A1* | 5/2021 | Guim Bernat ........ H04L 9/3247 |
| 2021/0149788 A1 | 5/2021 | Downie |
| 2021/0158835 A1 | 5/2021 | Hill et al. |
| 2021/0168150 A1 | 6/2021 | Ross et al. |
| 2021/0176123 A1 | 6/2021 | Plamondon |
| 2021/0176164 A1 | 6/2021 | Kung et al. |
| 2021/0185073 A1 | 6/2021 | Ewaida et al. |
| 2021/0200881 A1 | 7/2021 | Joshi et al. |
| 2021/0203684 A1 | 7/2021 | Maor et al. |
| 2021/0211453 A1 | 7/2021 | Cooney |
| 2021/0216630 A1 | 7/2021 | Karr |
| 2021/0218567 A1 | 7/2021 | Richards et al. |
| 2021/0226812 A1 | 7/2021 | Park et al. |
| 2021/0226928 A1 | 7/2021 | Crabtree et al. |
| 2021/0234889 A1 | 7/2021 | Burle et al. |
| 2021/0263802 A1 | 8/2021 | Gottemukkula et al. |
| 2021/0306416 A1 | 9/2021 | Mukhopadhyay et al. |
| 2021/0314342 A1 | 10/2021 | Oberg et al. |
| 2021/0320794 A1 | 10/2021 | Auh et al. |
| 2021/0329019 A1 | 10/2021 | Shua |
| 2021/0334386 A1 | 10/2021 | AlGhamdi et al. |
| 2021/0357246 A1 | 11/2021 | Kumar et al. |
| 2021/0360032 A1 | 11/2021 | Crabtree et al. |
| 2021/0368045 A1 | 11/2021 | Verma et al. |
| 2021/0382995 A1 | 12/2021 | Massiglia et al. |
| 2021/0382997 A1 | 12/2021 | Yi et al. |
| 2021/0409486 A1 | 12/2021 | Martinez et al. |
| 2022/0012771 A1 | 1/2022 | Gustafson et al. |
| 2022/0030020 A1 | 1/2022 | Huffman |
| 2022/0053011 A1 | 2/2022 | Rao et al. |
| 2022/0086173 A1 | 3/2022 | Yavo et al. |
| 2022/0131888 A1 | 4/2022 | Kanso et al. |
| 2022/0156396 A1 | 5/2022 | Bednash et al. |
| 2022/0179964 A1 | 6/2022 | Qiao et al. |
| 2022/0182403 A1 | 6/2022 | Mistry |
| 2022/0188273 A1 | 6/2022 | Koorapati et al. |
| 2022/0197926 A1 | 6/2022 | Passey et al. |
| 2022/0210053 A1 | 6/2022 | Du |
| 2022/0215101 A1 | 7/2022 | Rioux et al. |
| 2022/0232024 A1 | 7/2022 | Kapoor et al. |
| 2022/0232042 A1 | 7/2022 | Crabtree et al. |
| 2022/0247791 A1 | 8/2022 | Duminuco et al. |
| 2022/0263656 A1 | 8/2022 | Moore |
| 2022/0284362 A1 | 9/2022 | Bellinger et al. |
| 2022/0309166 A1 | 9/2022 | Shenoy et al. |
| 2022/0326861 A1 | 10/2022 | Shachar et al. |
| 2022/0327119 A1 | 10/2022 | Gasper et al. |
| 2022/0342690 A1 | 10/2022 | Shua |
| 2022/0342997 A1 | 10/2022 | Watanabe et al. |
| 2022/0345481 A1 | 10/2022 | Shua |
| 2022/0350931 A1 | 11/2022 | Shua |
| 2022/0357992 A1 | 11/2022 | Karpovsky |
| 2022/0374519 A1 | 11/2022 | Botelho et al. |
| 2022/0400128 A1 | 12/2022 | Kfir et al. |
| 2022/0407841 A1 | 12/2022 | Karpowicz |
| 2022/0407889 A1 | 12/2022 | Narigapalli et al. |
| 2022/0413879 A1 | 12/2022 | Passey et al. |
| 2022/0414103 A1 | 12/2022 | Upadhyay et al. |
| 2022/0417011 A1 | 12/2022 | Shua |
| 2022/0417219 A1 | 12/2022 | Sheriff |
| 2023/0007014 A1 | 1/2023 | Narayan |
| 2023/0040635 A1 | 2/2023 | Narayan |
| 2023/0075355 A1 | 3/2023 | Twigg |
| 2023/0087093 A1 | 3/2023 | Ithal et al. |
| 2023/0095756 A1 | 3/2023 | Wilkinson et al. |
| 2023/0110080 A1 | 4/2023 | Hen |
| 2023/0123477 A1 | 4/2023 | Luttwak et al. |
| 2023/0125134 A1 | 4/2023 | Raleigh et al. |
| 2023/0134674 A1 | 5/2023 | Quinn et al. |
| 2023/0135240 A1 | 5/2023 | Cody et al. |
| 2023/0136839 A1 | 5/2023 | Sundararajan et al. |
| 2023/0164148 A1 | 5/2023 | Narayan |
| 2023/0164182 A1 | 5/2023 | Kothari et al. |
| 2023/0169165 A1 | 6/2023 | Williams et al. |
| 2023/0171271 A1 | 6/2023 | Williams et al. |

(56) References Cited

U.S. PATENT DOCUMENTS

| | | |
|---|---|---|
| 2023/0192418 A1 | 6/2023 | Horowitz et al. |
| 2023/0208870 A1 | 6/2023 | Yellapragada et al. |
| 2023/0224319 A1 | 7/2023 | Isoyama et al. |
| 2023/0231867 A1 | 7/2023 | Rampura Venkatachar |
| 2023/0237068 A1 | 7/2023 | Sillifant et al. |
| 2023/0254330 A1 | 8/2023 | Singh |
| 2023/0297666 A1 | 9/2023 | Atamli et al. |
| 2023/0325814 A1 | 10/2023 | Vijayan et al. |
| 2023/0336550 A1 | 10/2023 | Lidgi et al. |
| 2023/0336578 A1 | 10/2023 | Lidgi et al. |
| 2023/0376586 A1 | 11/2023 | Shemesh et al. |
| 2024/0007492 A1 | 1/2024 | Shen et al. |
| 2024/0037229 A1 | 2/2024 | Pabon et al. |
| 2024/0045838 A1 | 2/2024 | Reiss et al. |
| 2024/0073115 A1 | 2/2024 | Chakraborty et al. |
| 2024/0080329 A1 | 3/2024 | Reed et al. |
| 2024/0080332 A1 | 3/2024 | Ganesh et al. |
| 2024/0146818 A1 | 5/2024 | Cody et al. |
| 2024/0241752 A1 | 7/2024 | Crabtree et al. |

FOREIGN PATENT DOCUMENTS

| | | |
|---|---|---|
| RU | 2421792 C2 | 6/2011 |
| SG | 10202009702X | 4/2021 |

OTHER PUBLICATIONS

Christos Kyrkou; Towards artificial-intelligence-based cybersecurity for robustifying automated driving systems against camera sensor attacks; IEEE 2020; pp. 476-481.

Guo, yu et al. Enabling Encrypted Rich Queries in Distributed Key-Value Stores. IEEE Transactions on Parallel and Distributed Systems, vol. 30, Issue: 6. https://ieeexplore.ieee.org/stamp/stamp.jsp?tp=&arnumber=8567979 (Year: 2019).

Henry Hanping Feng; Anomaly Detection Using Call Stack Information; IEEE: Year:2003; pp. 1-14.

International Search Report for PCT Application No. PCT/IB2022/060940 dated Feb. 1, 2023. The International Bureau of WIPO.

International Search Report for PCT/IB2023/050848, dated May 9, 2023. International Bureau of WIPO.

International Search Report of PCT/IB2023/058074, dated Nov. 20, 2023. Searching Authority United States Patent and Trademark Office, Alexandria, Virginia.

International Search Report, PCT/IB23/55312. ISA/US, Commissioner for Patents, Alexandria, Virginia. Dated Aug. 30, 2023.

Jordan, M. et al. Enabling pervasive encryption through IBM Z stack innovations. IBM Journal of Research and Development, vol. 62 Issue: 2/3, https://ieeexplore.ieee.org/stamp/stamp.jsp?tp&arnumber=8270590 (Year: 2018).

Kumar, Anuj et al. A New Approach for Security in Cloud Data Storage for IOT Applications Using Hybrid Cryptography Technique. 2020 International Conference on Power Electronics & IoT Applications in Renewable Energy and its Control. https://ieeexplore.ieee.org/stamp/stamp.jsp?tp=&arnumber=9087010 (Year: 2020).

Leibenger, Dominik et al. EncFS goes multi-user: Adding access control to an encrypted file system. 2016 IEEE Conference on Communications and Network Security (CNS). https://ieeexplore.ieee.org/stamp/stamp.jsp?tp=&arnumber=7860544 (Year: 2016).

Microsoft Build. "Introduction to Azure managed disks". Aug. 21, 2023, https://docs.microsoft.com/en-us/azure/virtual-machines/managed-disks-overview.

Microsoft Docs. "Create a VM from a managed image". Article. Jan. 5, 2022. https://docs.microsoft.com/en-us/azure/virtual-machines/windows/create-vm-generalized-managed.

Mishra, Bharati; Jena, Debasish et al. Securing Files in the Cloud. 2016 IEEE International Conference on Cloud Computing in Emerging Markets (CCEM). https://ieeexplore.ieee.org/stamp/stamp.jsp?tp=&arnumber=7819669 (Year: 2016).

No stated author; Downdetector; 2020; retrieved from the Internet https://web.archive.org/web/20201226001244/https://downdetector.com/; pp. 1-8, as printed. (Year: 2020).

No stated author; How to Run a Ping Test (Windows) 2020; retrieved from the Internet https://web.archive.org/web/20200811194856/https://support.shaw.ca/t5/internet-articles/how-to-run-a-ping-test-windows/ta-p/6677; pp. 1-6 as printed. (Year: 2020).

No stated author; IsItoownRightNow; 2020; retrieved from the Internet https://web.archive.org/web/20201202121557/https://www.isitdownrightnow.com/; pp. 1-2 as printed. (Year: 2020).

Sahil Suneja; Safe Inspection of Live Virtual Machines; IEEE; Year:2017; pp. 97-111.

Shuvo, Arfatul Mowla et al. Storage Efficient Data Security Model for Distributed Cloud Storage. 2020 IEEE 8th R10 Humanitarian Technology Conference (R10-HTC). https://ieeexplore.ieee.org/stamp/stamp.jsp?tp=&arnumber=9356962 (Year: 2020).

Siqi Ma; Certified Copy? Understanding Security Risks of Wi-Fi Hotspot based Android Data Clone Services; ACM; Year: 2021; pp. 320-331.

Written Opinion of the International Searching Authority for PCT Application No. PCT/IB2022/060940 dated Feb. 1, 2023. The International Bureau of WIPO.

Written Opinion of the International Searching Authority, PCT/IB23/55312. ISA/US Commissioner for Patents, Alexandria, Virginia. Dated Aug. 30, 2023.

Written Opinion of the Searching Authority for PCT/IB2023/050848, dated May 9, 2023. International Bureau of WIPO.

Written Opinion of the Searching Authority of PCT/IB2023/058074, dated Nov. 20, 2023. Searching Authority United States Patent and Trademark Office, Alexandria, Virginia.

Zhang et al. BMC Bioinformatics 2014. "On finding bicliques in bipartite graphs: a novel algorithm and its application to the integration of diverse biological data types". http://www.biomedcentral.com/1471-2105/15/110.

Chang, Bing et al. MobiCeal: Towards Secure and Practical Plausibly Deniable Encryption on Mobile Devices. 2018 48th Annual IEEE/IFIP International Conference on Dependable Systems and Networks (DSN). https://ieeexplore.ieee.org/stamp/stamp.jsp?tp=&arnumber=8416506 (Year: 2018).

Islam, Md Shihabul et al. Secure Real-Time Heterogeneous IoT Data Management System. 2019 First IEEE International Conference on Trust, Privacy and Security in Intelligent Systems and Applications (TPS-ISA). https://ieeexplore.ieee.org/stamp/stamp.jsp?tp=&arnumber=9014355 (Year: 2019).

Safaryan, Olga A et al. Cryptographic Algorithm Implementation for Data Encryption in DBMS MS SQL Server. 2020 IEEE East-West Design & Test Symposium (EWDTS). https://ieeexplore.ieee.org/stamp/stamp.jsp?tp=&arnumber=9224775 (Year: 2020).

Wassermann, Sarah et al. ViCrypt to the Rescue: Real-Time, Machine-Learning-Driven Video-QoE Monitoring for Encrypted Streaming Traffic. IEEE Transactions on Network and Service Management, vol. 17, Issue: 4. https://ieeexplore.ieee.org/stamp/ stamp.jsp?tp=&arnumber=9250645 (Year: 2020).

* cited by examiner

EFFICIENT REPRESENTATION OF MULTIPLE CLOUD COMPUTING ENVIRONMENTS THROUGH UNIFIED IDENTITY MAPPING

CROSS-REFERENCE TO RELATED APPLICATIONS

This application claims the benefit of U.S. Provisional Application No. 63/222,709 filed on Jul. 16, 2021, the contents of which are hereby incorporated by reference.

TECHNICAL FIELD

The present disclosure relates generally to cybersecurity and, in particular, to techniques for multi-tenant agentless vulnerability scanning through unified identity mapping.

BACKGROUND

As users migrate data storage, processing, and management tasks to decentralized, off-location devices, platforms, and services, the limitations of such devices, platforms, and services, also referred to as cloud environments, platforms, and the like, may impact a user's data operations. Specifically, vulnerabilities within cloud-deployed resources and processes may present unique challenges requiring remediation. Due to the scale and structure of cloud systems, detection of workload vulnerabilities, which detection may be readily-provided in non-cloud deployments, may require numerous, complex tools and operations.

Current solutions to cloud workload vulnerability scanning challenges require the deployment of specialized tools, including scanning agents directed to maintenance of virtual machines (VMs), where operation and maintenance of such tools may be costly, time-consuming, or both. Agent-dependent processes fail to provide for scanning of containers, such as containers managed using Kubernetes®, and other, like, container-management platforms, and may fail to provide for coverage of serverless applications. Existing agent-implementation processes or solutions fail to provide for full cloud workload vulnerability scanning, additional methods, such as snapshot-based scanning, may supplement implemented solutions.

Additionally, many organizations prefer not to be constrained by a single cloud architecture, and utilize cloud computing environments across multiple cloud architectures. For example, an organization may have a first cloud computing environment deployed using Google® Cloud Platform (GCP), a second cloud computing environment deployed using Amazon® Web Services (AWS), and so on.

While this allows an organization to enjoy the benefits of each different architecture, it presents a new type of management problem. Users require different user accounts, for example, to access the resources of each cloud environment. Managing user accounts and service accounts can rapidly become a complex problem, especially in a large organization which further provides access to internal resources to third party applications, vendors, and the like.

It would, therefore, be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for generating a security graph utilizing a unified model based on multiple cloud computing environments. The method comprises: receiving data from a first cloud computing environment pertaining to: a plurality of resources, a plurality of principals, and a plurality of permissions; generating for each resource of the plurality of resources a corresponding resource node in the security graph based on the unified model, the corresponding resource node including an identifier of the resource, wherein the resource is a cloud entity deployed in the first cloud computing environment; generating for each principal of the plurality of principals a corresponding principal node in the security graph based on the unified model, the corresponding principal node including an identifier of the principal, wherein the principal is a cloud entity in the first cloud computing environment that generate a request for an operation in the first cloud computing environment; and generating a connection between at least a principal node and at least a resource node in the security graph, in response to detecting a permission indicating that a principal corresponding to the at least a principal node can access a resource corresponding to the at least a resource node.

Certain embodiments disclosed herein include a non-transitory computer readable medium having stored thereon instructions for causing a processing circuitry to perform a process for generating a security graph utilizing a unified model based on multiple cloud computing environments. The process includes: receiving data from a first cloud computing environment pertaining to: a plurality of resources, a plurality of principals, and a plurality of permissions; generating for each resource of the plurality of resources a corresponding resource node in the security graph based on the unified model, the corresponding resource node including an identifier of the resource, wherein the resource is a cloud entity deployed in the first cloud computing environment; generating for each principal of the plurality of principals a corresponding principal node in the security graph based on the unified model, the corresponding principal node including an identifier of the principal, wherein the principal is a cloud entity in the first cloud computing environment that generate a request for an operation in the first cloud computing environment; and generating a connection between at least a principal node and at least a resource node in the security graph, in response to detecting a permission indicating that a principal corresponding to the at least a principal node can access a resource corresponding to the at least a resource node.

Certain embodiments disclosed herein include a system for generating a security graph utilizing a unified model based on multiple cloud computing environments. The system comprises a processing circuitry and a memory, the memory containing instructions that, when executed by the processing circuitry, configure the system to: receive data from a first cloud computing environment pertaining to a plurality of resources and a plurality of principals of the first cloud computing environment, the data including a plurality of identifiers and a plurality of permissions; generate for each resource of the plurality of resources a corresponding resource node in a unified model graph, the corresponding resource node including an identifier of the resource; generate for each principal of the plurality of principals a corresponding principal node in the unified model graph, the corresponding principal node including an identifier of the principal; and generate a connection between at least a principal node and at least a resource node in the unified model graph, in response to detecting a permission indicating that a principal corresponding to the at least a principal node can access a resource corresponding to the at least a resource node.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
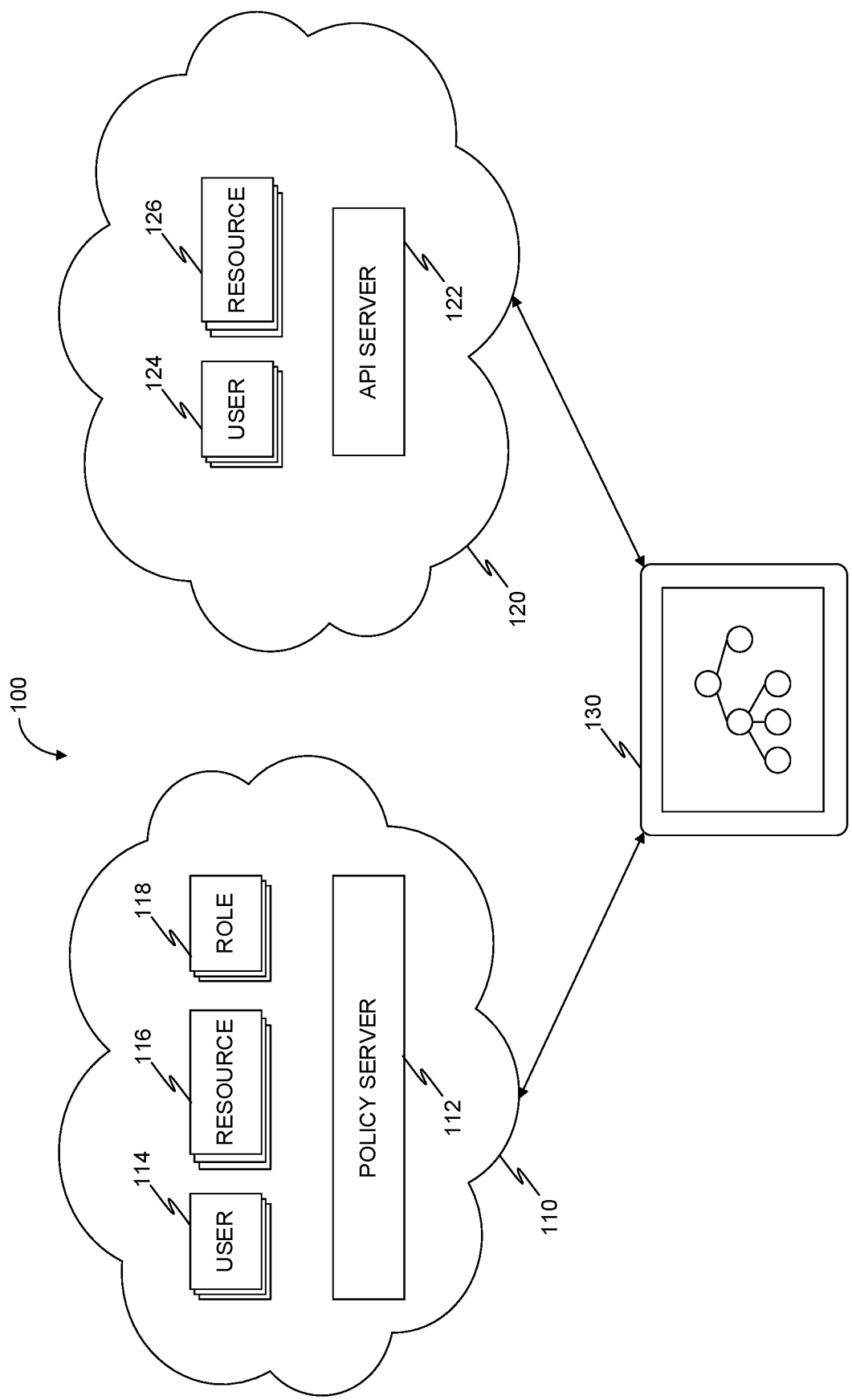
FIG. 1 is a schematic illustration of multiple cloud-based computing environments communicatively connected to a unifying identity mapper, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Organizations use multiple cloud computing environments to accomplish tasks and provide services. Each cloud computing environment may be utilized in a different manner, complicating an organization's interaction with them. The disclosure teaches providing a unified model in a security graph consisting of principals acting on resources, and methods of mapping different cloud computing environments to the unified model in the security graph. The unified model provides for a normalized view of an organizations principals and resources across various compute environments. The unified model in the security graph allows, for example, to map identities across cloud computing environments and detect permission escalations.

Some example embodiments include identity mapping to allow detection of vulnerabilities in cloud computing environments. The identity mapping may include mapping principals and resources of each cloud computing environment to a unified model, by accessing data from the environment. Mapping is further based on permissions read from the cloud computing environment. In an embodiment mapping identities includes representing each identity as a node in a security graph. Traversing the security graph allows detection of cybersecurity threats, for example, by detecting permission escalation potential between two or more principal nodes.

In order to decrease complexity of the graph, various optimizations, such as utilizing maximal biclique, are implemented when generating connections in the graph between principals and resources. The disclosed embodiments allow to decrease memory usage and processing resources, resulting in a system with increased security utilizing less resources than the currently available solutions.

FIG. 1 is a schematic illustration 100 of multiple cloud computing environments communicatively connected to a unifying identity mapper, implemented in accordance with an embodiment. Cloud computing environments may each operate with one or more standards (i.e., models), and achieve similar or different functionality in different or similar manners. An organization of users may use a first type of cloud environment for a first purpose, where it is advantageous, and a second type of cloud environment for a second purpose, where the second environment is likewise advantageous. Amazon® Web Services (AWS), Google® Cloud Platform (GCP) and Microsoft® Azure are all examples of cloud computing infrastructures. Within such an infrastructure, an organization may have their own cloud environment, for example implemented as a virtual private cloud (VPC). For example, an organization may use AWS as a first cloud environment, and GCP as a second cloud environment. GCP may define a service account as having a first set of attributes, while AWS may define a service account as a user account having a second set of attributes, where at least a portion of the attributes of the first and second sets overlap.

However, utilizing different cloud environments may lead to complicated security policies, which in turn can present vulnerabilities for an organization. In order to at least minimize these risks, it would be beneficial to have a single normalized model for all cloud environments. Such a single normalized model would allow to identify where potential threats and risks are.

Generally, every cloud computing environment includes principals, which act on resources. A principal is a cloud entity which can generate a request for an action or operation to occur in the cloud environment, where the action or operation involves a resource. In an embodiment a principal may be implemented as a cloud entity having an identifier (e.g., email address) associated with a set of permissions. A permission may allow the principal to generate service requests in the cloud environment. A principal may be a user account, service account, role, and the like, while a resource may be a virtual machine, container, serverless function, and the like. Each cloud environment may include different definitions and structures for what constitutes a principal or a resource. For example, in some cloud computing environments code may execute as a user account rather than a service account, while in others code can only execute as a service account.

As demonstrated in FIG. 1, a first type of cloud-based computing environment (hereinafter "cloud environment") 110 includes a plurality of user accounts 114, a plurality of resources 116, and a plurality of roles 118. A role 118 is a set of one or more permissions which may be associated with one or more user accounts 114. A user account 114 may be associated with a plurality of roles. The cloud environment 110 further includes a policy server, which includes one or more security policies, Each security policy (or simply policy) includes one or more permissions which allow a user account 114, a role 118 or both, access to a resource 116. A policy may be, for example, a JSON file including therein text which indicates what certain permissions are. A policy may include wildcards, allowing, for example, every user account having an email address at a first domain access to a first resource, and user accounts having an email address at a second domain access to the first resource and to a second resource. For example, the first type of cloud environment may be an AWS type cloud environment.

A second type of cloud environment 120 includes a plurality of user accounts 124, a plurality of resources 126, and an API server 122. The API server 122 may provide upon request data including user accounts, applications, resources, and relationships (i.e., permissions) between them. For example, the second type of cloud environment may be a GCP type cloud environment.

Each of the cloud environments 110 and 120 are connected to a unifying identity mapper 130 over a network (not shown). A cloud environment may be, for example, Amazon® Web Services (AWS), Google® Cloud Platform, Microsoft® Azure, and the like. The first and second cloud environments 110, 120 may be the same type of cloud environment, or different types of cloud environments. For example, a first cloud environment may be spun up in AWS, while the second cloud environment is spun up in Azure. As another example, the first and second cloud environments 110, 120 may be both spun up in AWS, as separate environments under the same cloud computing architecture, e.g. utilizing a first VPC for the first cloud environment 110 and a second VPC for the second cloud environment 120.

In some embodiments, the unifying identity mapper ("mapper 130") may reside in the first cloud environment 110, the second cloud environment 120, or a different networked or cloud computing environment. The mapper 130 is configured to receive from each cloud environment data pertaining to cloud entities, such as users, resources, roles, policies, permissions, and the like. Receiving such data may be different based on the cloud environment architecture. For example, Google® Cloud Platform provides such information by accessing an API, which may be queried to receive text based policies, a list of user accounts, a list of service accounts, a combination thereof, and the like.

In an embodiment, the mapper 130 is configured to call the API with a request to receive the data. As another example, AWS provides policies which may be requested as JSON files. The mapper 130 is further configured to read the data from, for example, the JSON file and map the read (or received) data into a unified model of a security graph. Mapping the received data may include generating nodes in a security graph representing principals and resources, and connecting the nodes based on permissions which are read from the received data. This is discussed in more detail in FIG. 3 herein. The security graph may be stored in a graph database 135. A graph database may be, for example, Neo4j®. The mapper 130 may be implemented as a physical machine, a virtual machine, a node of a container, and the like. An embodiment of a mapper 130 is discussed in more detail in FIG. 7 below.

Figure 2A:
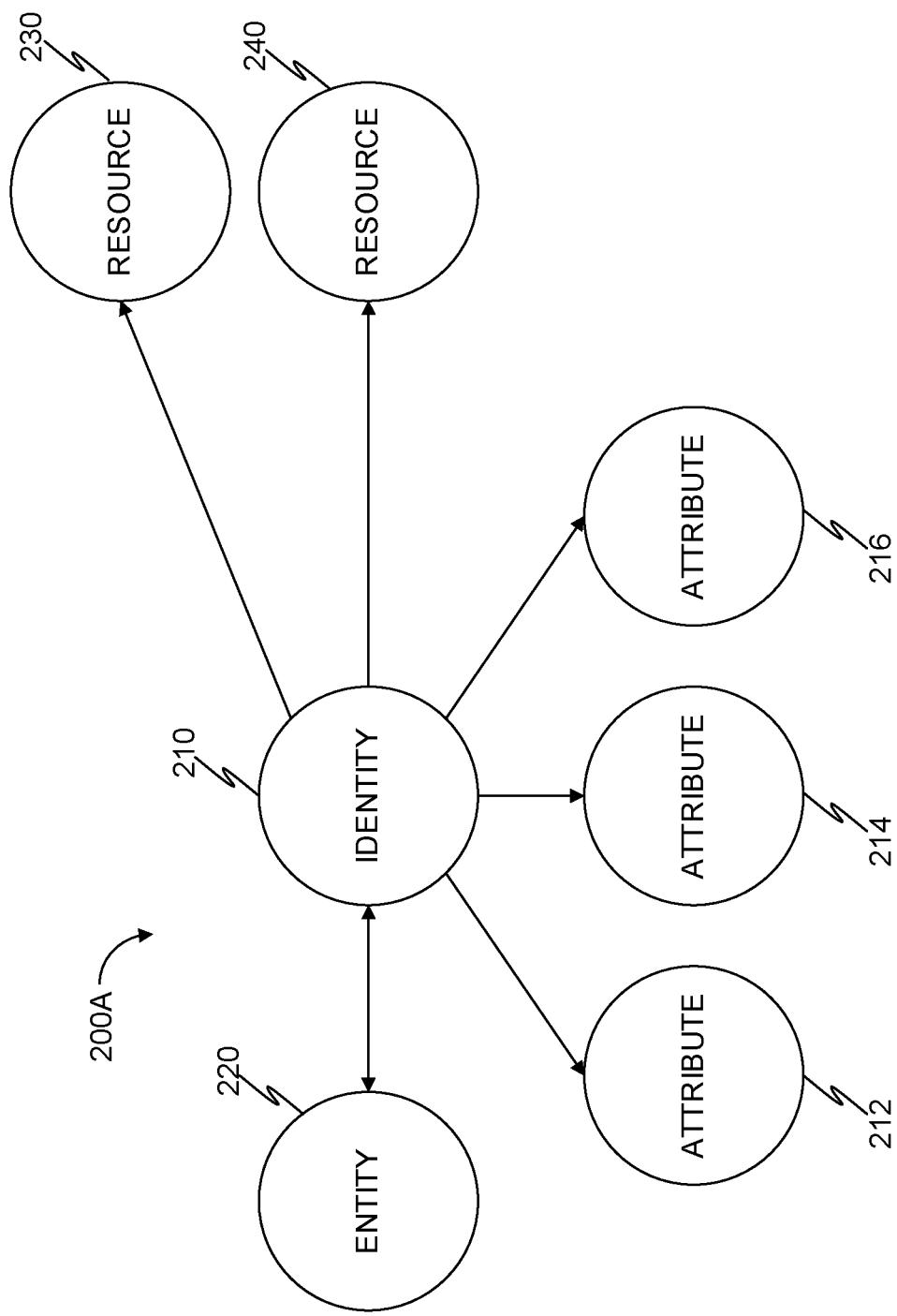
FIG. 2A is a portion of a security graph using a unified model generated by the mapper and generated in accordance with an embodiment.

FIG. 2A is a portion of a security graph using a unified model 200A generated by the mapper 130 and generated in accordance with an embodiment. An identity is an example of a principal, which acts on resources, such as first resource 230 and second resource 240. In an embodiment, an identity is a set of attributes stored as digital information which represent a principal. An identity 210, such as a username, may be associated with an entity 220. The entity 220 may be a person, organization, application, device, machine, and so on.

Each identity 210 may be connected to a plurality of attributes, such as a first attribute 212, a second attribute 214, and third attribute 216. While three attributes are used in this example, it is readily understood that any number of attributes may define an identity node, and that each identity node may be defined by one or more attributes. An attribute may be metadata. For example, a role may be an attribute of an identity node.

Figure 2B:
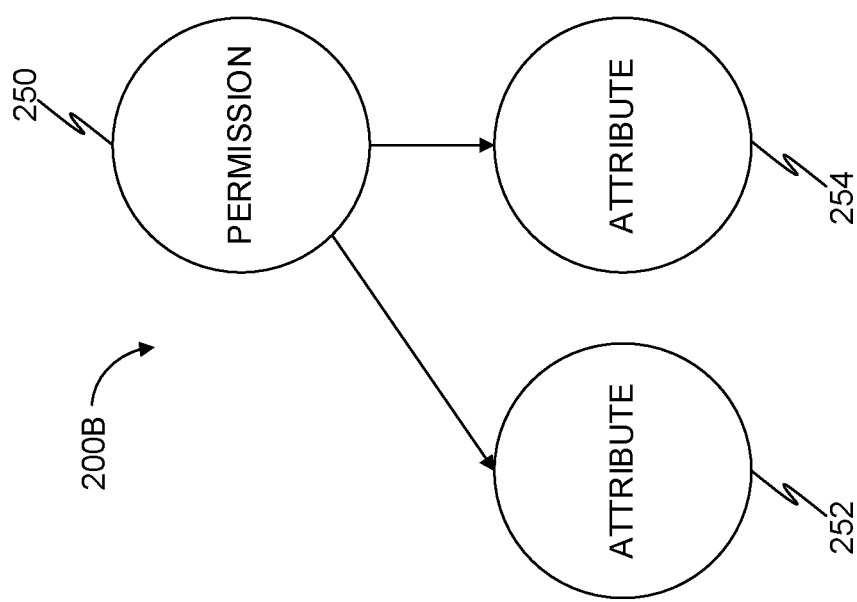
FIG. 2B is another portion of a security graph using a unified model generated by the mapper and generated in accordance with an embodiment.

FIG. 2B is another portion of a security graph using a unified model 200B generated by the mapper 130 and generated in accordance with an embodiment. A permission node 250 is connected with a first attribute node 252, and a second attribute node 254. While two attributes are used in this example, it is readily understood that any number of attributes may define a permission node 250, and that each permission node may be defined by one or more attributes. An attribute of a permission node 250 may indicate different permission types, such as reading, writing, or erasing files, agents, administrator or root roles, and the like. A permission node 250 may be connected to an identity node, such as the identity node 210 of FIG. 2A.

Figure 3:
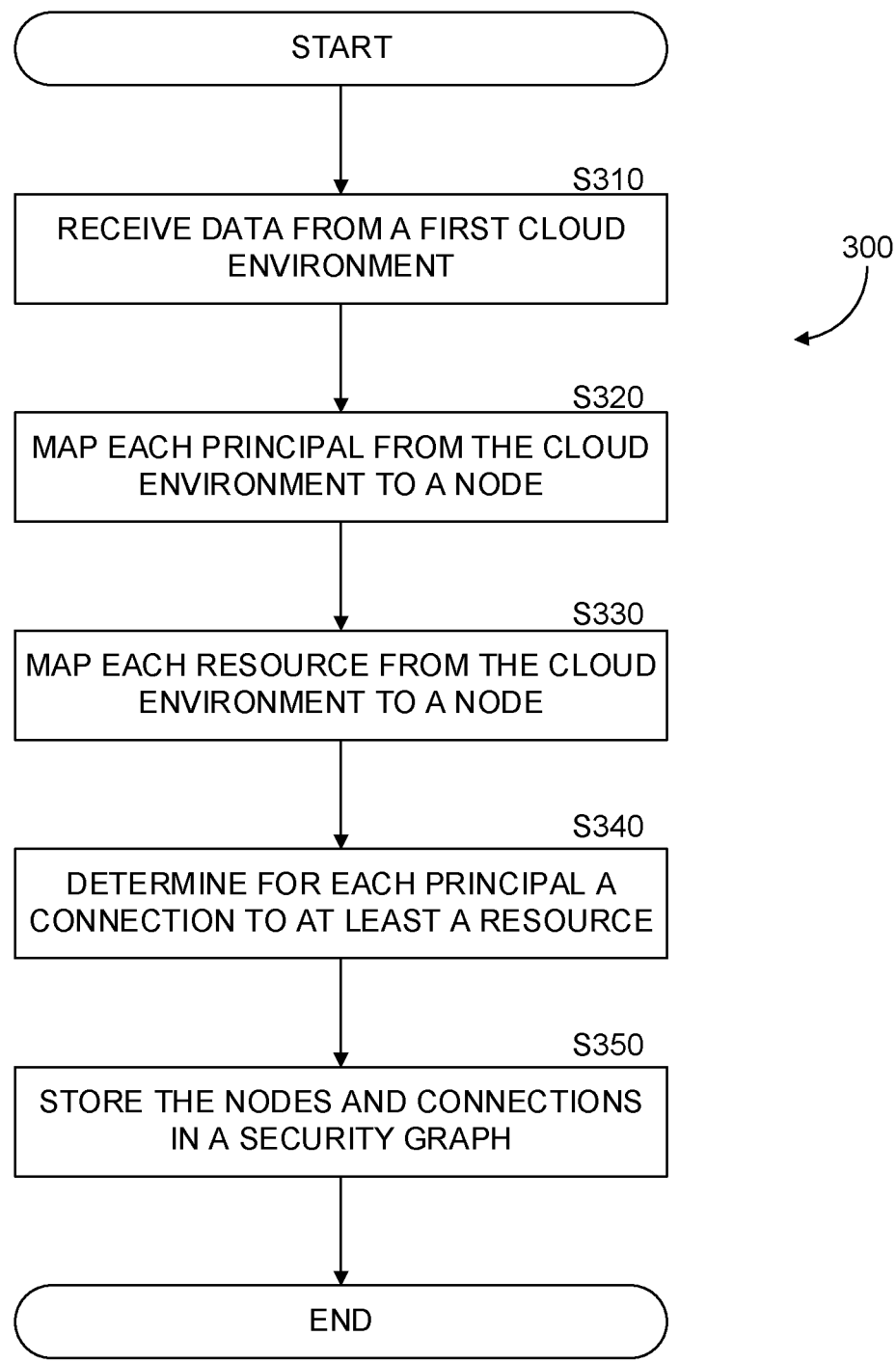
FIG. 3 is a flowchart of a method for mapping principals and resources from a first computing environment to a security graph in accordance with an embodiment.

FIG. 3 is an example flowchart 300 of a method for mapping principals and resources from a first computing environment to a security graph in accordance with an embodiment. In an embodiment the method is performed by the unified identity mapper 130, FIG. 1.

At S310, data is received from at least a first cloud environment. In certain embodiments, data may be received from a plurality of first cloud environments. In some embodiments, data may be further received from a second cloud environment. The second cloud environment may be different from the first cloud environment. For example, the first cloud environment may be an AWS-type cloud environment, while the second cloud environment may be an Azure-type cloud environment. Data may include any information relating to principals, resources, and connections between principals and resources. For example, data may be received by querying an API of a cloud environment to receive user account information, service account information, policies, and the like.

A principal is a cloud entity which can generate a request for an action or operation to occur in the cloud environment, where the action or operation involves a resource. In an embodiment a principal may be implemented as a cloud entity having an identifier (e.g., email address) associated with a set of permissions. A permission may allow the principal to generate service requests in the cloud environment. A principal may be a user account, service account, role, and the like. For example, a role is a set of one or more permissions which may be associated with one or more user accounts. Permissions may be defined, for example, by a policy. A policy may be, for example, a JSON file including therein text which indicates what certain permissions are.

A resource is a cloud entity which includes compute elements, such as storage, memory, parallel processor, linear processor, a combination thereof, and the like. In an embodiment a resource may be, for example, a virtual machine, a container, a serverless function, a bucket, a WAF (Web Application Firewall), a gateway, a proxy server, an application, an appliance, a database, and the like.

At S320, each principal from the first cloud environment is mapped to a corresponding principal node of a security graph using a unified model. In an embodiment, this is performed by generating the principal node in the security graph based on the unified model and associating the principal node with the principal (e.g., associating the principal node with an identifier of the principal). In an embodiment a unified model is a data structure template including a plurality of principal attributes, such that a data structure may be generated for each principal, and at least a portion of the plurality of attributes may have values generated based on attributes of the principal.

A principal node may be, for example, an identity node. For example, a user account is a principal, and the user account is mapped to a principal node representing the user account. The security graph may further store as attributes metadata associated with the user account, such as a username, account type, role, and the like. In an embodiment, a principal from a first cloud environment and a principal from a second cloud environment may be each mapped to a corresponding first and second principal nodes. The first and second principal nodes may be connected to an entity node. This may indicate, for example, that a single entity (e.g., human user) is associated with a user account represented by the first principal node, and a user account represented by the second principal node. Connecting the first and second principal nodes to the entity node may be based on performing a match between attribute values. An attribute may be, for example, a username, email address, role (e.g., admin, root, etc.), and the like. A resource such as a serverless function, is mapped to a resource node representing the serverless function. The security graph may further store for the resource node metadata such as IP address, name, etc.

At S330, each resource from the first cloud environment is mapped to a corresponding resource node of the unified model of the security graph. In an embodiment, this is performed by generating the resource node and associating it with the resource (e.g., associating the resource node with a unique identifier of the resource). The generated nodes may include information which points to the identity/resource to which they are mapped, thereby enabling a trace between the representation (e.g., principal node) and the represented object (specific username). In some embodiments, an entity in a cloud environment may be a principal, and also a resource to other principals. For example, a load balancer may be a resource for a user account, but a principal for a web server which utilizes the load balancer.

At S340 a connection is determined for each principal node to at least another node. The at least another node may be a resource node, or another principal node, such as a role node. A role node is associated with a specific role (i.e., set of one or more permissions relating to a resource). In an embodiment, the connection to a principal node is determined based on a permission allowed to the principal node. In an embodiment, determining a connection may include reading data from a security policy in order to determine if a permission exists to allow communication between the principal node and another principal node, a resource node, a combination thereof, and the like.

At S350 the nodes and connections are stored in the security graph. Storing the nodes and connections (also referred to as edges) in the security graph may include generating in the security graph a data structure based on a template of a unified model, and updating a graph database containing therein the security graph based on the generated data structure. A template may include data attributes. In an embodiment, the unified model includes a plurality of templates, each template corresponding to a cloud entity.

A unified model is useful, for example, for normalizing different cloud infrastructures, which may represent principals, resources, and the like in different ways. For example, a user account may be implemented utilizing different technology stacks in AWS or GCP, especially when taking into account associating permissions, roles, policies, and the like, with a user account. By representing all user accounts using a unified data structure in a security graph, a user querying the graph can get visibility into an organization's entire technology stack, regardless of what cloud infrastructures are used to implement it. Additionally, the methods disclosed herein provide for populating this unified model from multiple cloud environments in an efficient manner in terms of computation (i.e., processor) use, memory use, and storage use. Another advantage of storing a representation of multiple cloud environments using a unified model according to the teachings herein is in allowing to store a single representation (i.e., single graph for all cloud environments) rather than store multiple representations in multiple different systems. Therefore, memory and storage are utilized in a more efficient manner.

Figure 4:
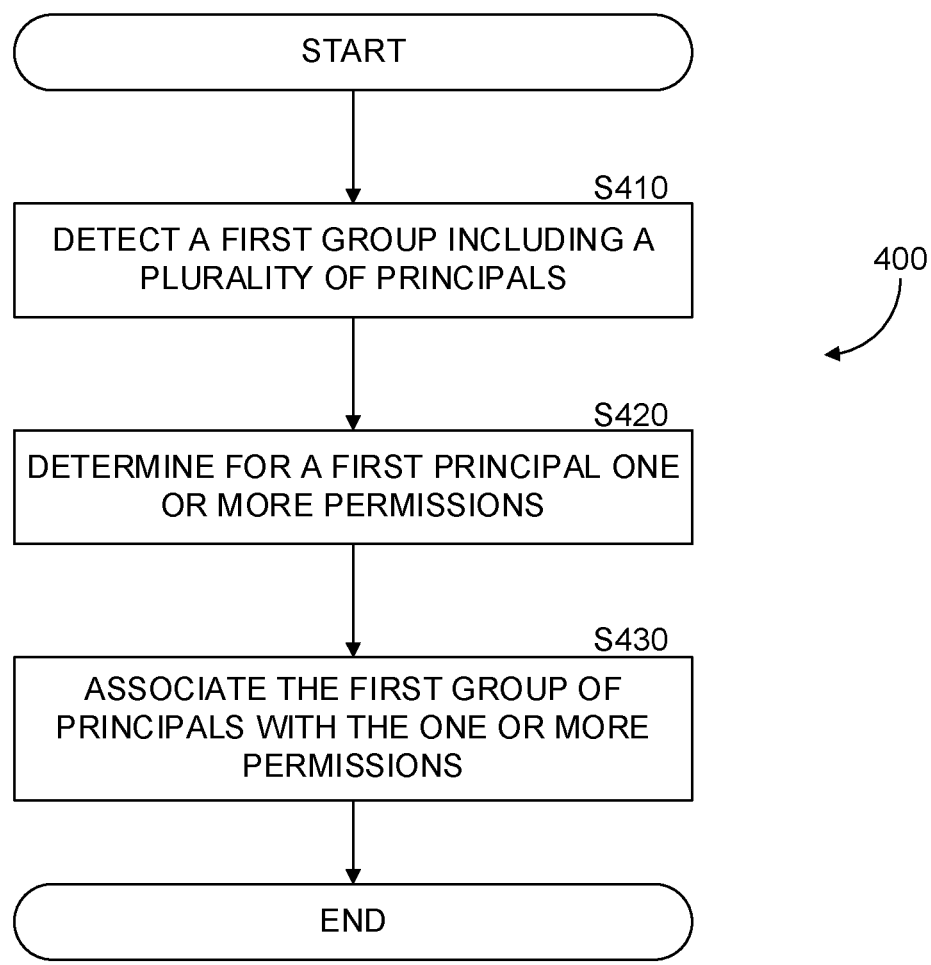
FIG. 4 is a flowchart of a method for determining effective permissions of a principal in a cloud environment, implemented in accordance with an embodiment.

FIG. 4 is an example flowchart 400 of a method for determining effective permissions of a principal in a cloud environment, implemented in accordance with an embodiment. Effective permissions are permissions which a principal has in the cloud environment in which the principal is deployed. The permissions may include a set of actions and operations which the principal can instruct the cloud environment, or one or more resources of the cloud environment, to perform. Determining effective permissions is advantageous from a security perspective as it allows to realistically understand where potential security threats may arise. For example, assuming a certain user has limited permissions, only to discover that the user has permissions which exceed those limitations, is a typical scenario in cybersecurity incidents (e.g., limited third party vendor having administrator permissions).

A naïve approach for determining effective permission would be to determine for each principal represented in the security graph each possible interaction with each resource. However, for typical cloud environments, this can lead to large and complicated calculations, thus requiring large compute and memory resources to accomplish, and in most cases, it is not a feasible solution. An optimization is therefore proposed.

At S410, a first group of a plurality of principals is detected in a security graph. Detecting a group of principals may be performed, for example, by utilizing maximal bicliques. A biclique is a bipartite graph where every node of the first set (principals) is connected to every node of the second set (resources). A biclique is maximal when it is the largest size, based on number of nodes or number of edges. The security graph may be generated for example as detailed in FIG. 3 above. A group of principals may be detected, for example by querying the security graph to detect all users belonging to a certain role, belonging to a certain group, having a specific permission directed at a specific resource (e.g., allowed to write to a first database), and the like.

At S420, one or more permissions are determined for a first principal of the first group. The one or more permissions may be associated with one or more resources. For example, a first permission set (i.e., role) may be associated with a first resource, a second permission set may be associated with a second resource, and so on. In an embodiment, determining the one or more permissions may be performed by querying the security graph to determine what nodes of roles, permissions, policies, and the like, a principal node representing the first principal is connected to.

At S430, the first group of principals is associated with the determined one or more permissions. By associating all the principals based on determining permissions for a single principal, many redundant calculations are spared, thereby reducing compute and memory required for storing the redundant information. For example, a node representing the determined one or more permissions (permission node) may be generated in the security graph. Nodes representing the first group of principals may be connected to the permission node, thereby associating the first group of principals with the permissions. This approach means permissions do not have to be determined for each and every principal, resulting in less processing. Further, by representing permissions as a node, the graph is more compact as less memory is used, since redundant data (i.e., repeating permissions) is not stored.

Figure 5:
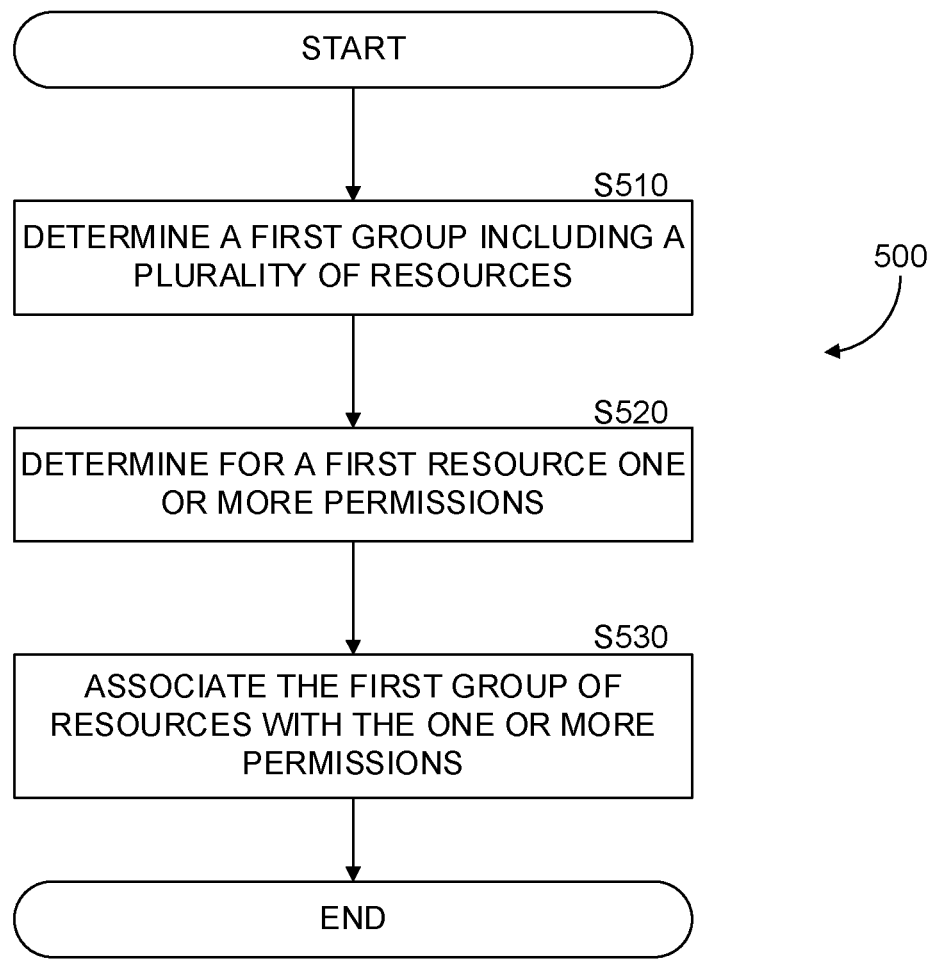
FIG. 5 is a flowchart of a method for determining effective permissions of a resource in a cloud environment, implemented in accordance with an embodiment.

FIG. 5 is an example flowchart 500 of a method for determining effective permissions of a resource in a cloud environment, implemented in accordance with an embodiment. Determining effective permissions is advantageous from a security perspective as it allows to realistically understand where potential security threats may arise. For example, assuming a certain resource may be supposed to have limited permissions, however, the resource can assume a role which would allow the resource additional permissions which were not intended.

As stated above, a naïve approach would be to determine for each resource in the graph each possible interaction with each principal and resource. However, for typical cloud environments, this can lead to a large and complicated calculations, thus requiring large compute and memory resources to accomplish, and in most cases, it is not a feasible solution. An optimization is therefore proposed.

At S510, a first group of a plurality of resources is detected in a security graph. Detecting a group of resources may likewise be performed, for example, by utilizing maximal bicliques. As noted above, a biclique is a bipartite graph where every node of the first set (principals) is connected to every node of the second set (resources). A biclique is maximal when it is the largest size based on number of nodes or number of edges.

At S520, one or more permissions are determined for a first resource of the first group. In an embodiment, a permission is determined for a first resource by performing a search of one or more policies to detect a policy which is applied to the first resource. A policy may include a permission (e.g., ability to write to the resource) and a condition specifying what principal(s) or principal type (e.g., role) may utilize the permission. The one or more permissions may be associated with one or more resources or principals. For example, a first permission set (i.e., role) may be associated with a first resource, a second permission set may be associated with a second resource, and the like.

A permission may be, for example, permission to read data from a storage, and permission to write data to the storage. For example, a first group may have permission to read from the storage, while a second group may have permissions to read and write to the storage. As another example, a user may have permission to write to a first storage of a distributed storage system, which includes multiple storage devices. As the multiple storage devices share a common policy, the user has permission to write to any of the multiple storage devices. By grouping the storage devices, less memory is required to indicate that the user account has permission to write to any of the multiple storage devices.

At S530, the first group of resources is associated with the determined one or more permissions. By associating all the resources based on determining permissions for a single resource, many redundant calculations are spared, thereby reducing compute and memory required for storing the redundant information. For example, the first resource 230 and second resource 240 of FIG. 2A may be associated with permissions based on permissions determined for the first resource 230. A permission node may be generated in the security graph, and the first resource node 230 and second resource node 240 may be connected to the permission node.

Figure 6:
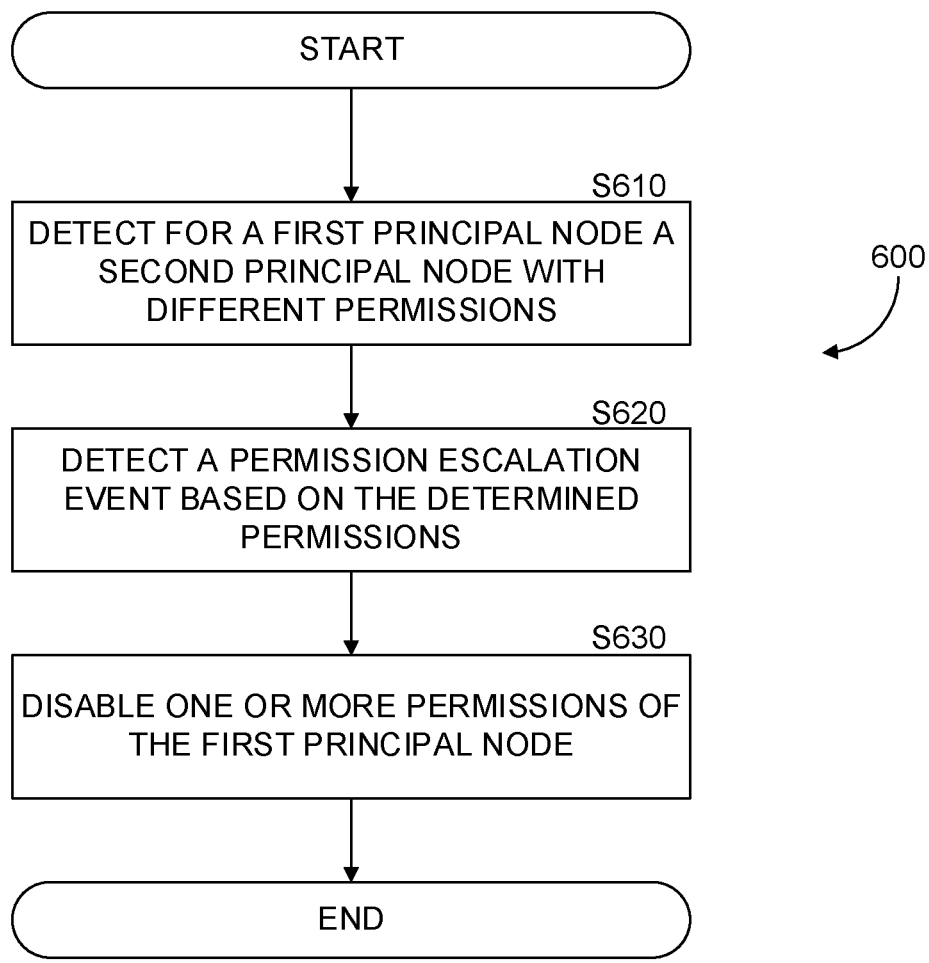
FIG. 6 is a flowchart of a method for detecting permission escalation utilizing a unified identity model implemented in a security graph, implemented in accordance with an embodiment.

FIG. 6 is an example flowchart 600 of a method for detecting permission escalation utilizing a unified identity model implemented in a security graph, implemented in accordance with an embodiment. Permission escalation is a type of security risk where a principal has access to resources which they are not intended to have. A vertical escalation occurs when a principal is able to access resources which are only accessible to principals having higher access. A horizontal escalation occurs when a principal has access to resources of another similar principal (e.g., user A is able to access emails of user B).

At S610, a second principal node is detected for a first principal node. The first principal node is able to assume the second principal node. That is, the first principal node may act as the second principal nodes, in some, or all aspects, meaning the first principal node may request actions or generate instructions which are not permitted to the first principal, but are permitted to the second principal. Permissions of a node may change when acting through another. For example, an application may have permission to perform a wide variety of operations in a cloud environment. However, a user account operating the application may only access limited permissions of all the permissions available to the application.

At S620, a permission escalation event is detected based on determined permissions of the first principal node and the second principal node. In an embodiment, detecting a permission escalation event may occur when an access occurs which involves a principal which is not authorized for the access. This detection is possible by tracing the connection between the access and the principal, utilizing the security graph (e.g., traversing the graph between nodes) as described above.

At S630, upon detection of permission escalation events, one or more permissions associated with the principal may be revoked to prevent the escalation. In another embodiment, a notification may be generated to an administrator account to notify that a potential permission escalation may occur.

Figure 7:
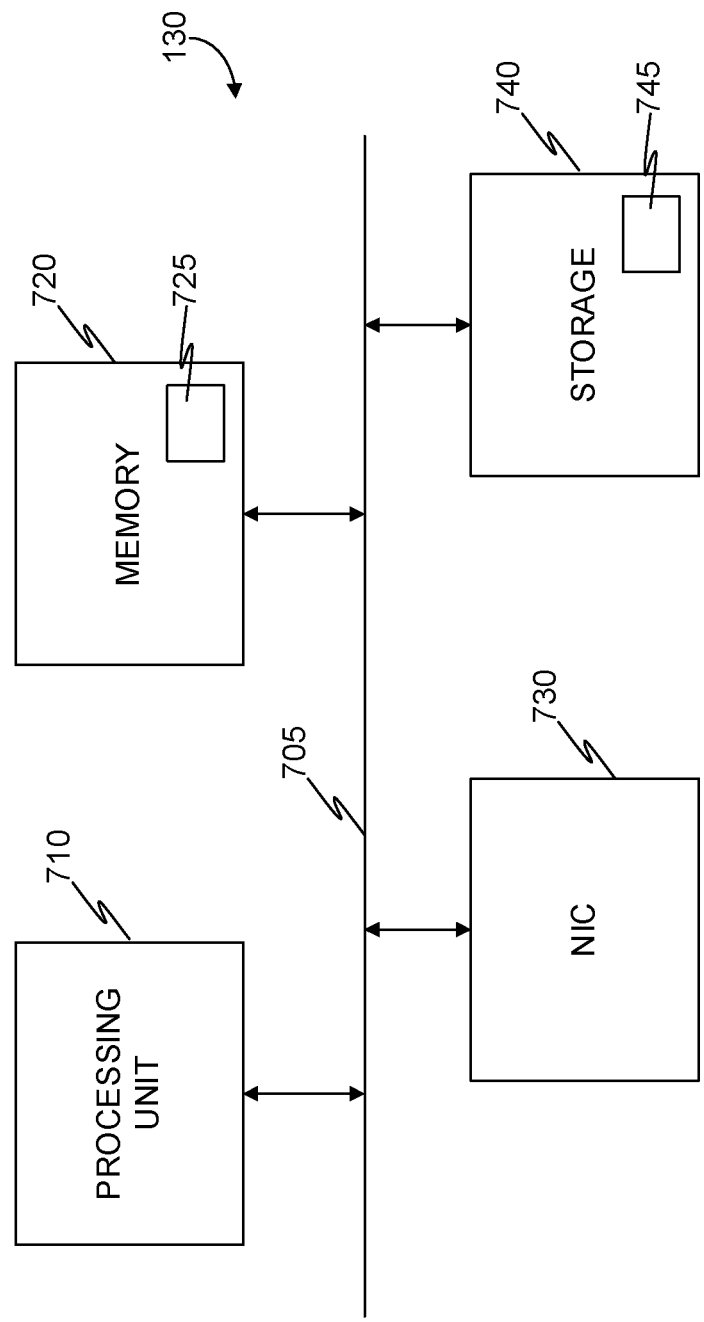
FIG. 7 is a schematic illustration of a mapper, implemented according to an embodiment.

FIG. 7 is an example of a schematic illustration of the mapper 130 implemented according to an embodiment. The mapper may be a physical or virtual machine. The mapper 130, when realized as a physical machine, includes at least one processing element 710, for example, a central processing unit (CPU). In an embodiment, the processing element 710 may be, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing element 710 is coupled via a bus 705 to a memory 720. The memory 720 may include a memory portion 722 that contains instructions that when executed by the processing element 710 performs the method described in more detail herein. The memory 720 may be further used as a working scratch pad for the processing element 710, a temporary storage, and others, as the case may be. The memory 720 may be a volatile memory such as, but not limited to random access memory (RAM), or non-volatile memory (NVM), such as, but not limited to, Flash memory.

The processing element 710 may be coupled to a network interface controller (NIC) 730, which provides connectivity to one or more cloud computing environments, via a network.

The processing element 710 may be further coupled with a storage 740. Storage 740 may be used for the purpose of holding a copy of the method executed in accordance with the disclosed technique. The storage 740 may include a storage portion 745 containing a graph model into which principals and resources of a cloud environment are mapped to corresponding nodes, and connections between the nodes are determined based on data received from the cloud environment indicating permissions of each principal to act on one or more resources.

The processing element 710 and/or the memory 720 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units (CPUs), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for generating a security graph utilizing a unified model based on multiple cloud computing environments, comprising:
   receiving data from a first cloud computing environment pertaining to: a plurality of resources, a plurality of principals, and a plurality of permissions;
   generating for each resource of the plurality of resources a corresponding resource node in the security graph based on the unified model, the corresponding resource node including an identifier of the resource, wherein the resource is a cloud entity deployed in the first cloud computing environment;
   generating for each principal of the plurality of principals a corresponding principal node in the security graph based on the unified model, the corresponding principal node including an identifier of the principal, wherein the principal is a cloud entity in the first cloud computing environment that generates a request for an operation in the first cloud computing environment; and
   generating a connection between at least a principal node and at least a resource node in the security graph based on the unified model, in response to detecting a permission indicating that a principal corresponding to the at least a principal node can access a resource corresponding to the at least a resource node.

2. The method of claim 1, wherein a principal the plurality of principals is any one of: a user account, a service account, and a role.

3. The method of claim 1, wherein a resource of the plurality of resources is any one of: a virtual machine, a container, and a serverless function.

4. The method of claim 1, further comprising:
   requesting the data from an application programming interface (API) of the first cloud computing environment.

5. The method of claim 1, wherein receiving the data further comprises:
   reading at least one text based policy received from the first cloud computing environment, each of the at least one policy indicating at least one permission for the plurality of principals to act on the plurality of resources.

6. The method of claim 1, further comprising:
receiving data from a second cloud computing environment pertaining to a plurality of resources and a plurality of principals of the second cloud computing environment, the data including a plurality of identifiers and a plurality of permissions;
generating a resource node for each resource of the plurality of resources, in response to determining that a resource of the second cloud computing environment is not represented in the security graph by a corresponding resource node; and
generating a principal node for each principal of the plurality of principals, in response to determining that a principal of the second cloud computing environment is not represented in the unified model graph by a corresponding principal node.

7. The method of claim 6, further comprising:
mapping a resource of the second cloud computing environment to a resource node in the unified model graph, in response to determining that the resource of the second cloud computing environment is represented in the security graph by the resource node.

8. The method of claim 7, wherein determining further comprises:
comparing an identifier of the resource to an identifier of the resource node; and
mapping the resource to the resource node in response to determining that the identifier of the resource is identical to the identifier of the resource node.

9. The method of claim 6, further comprising:
generating an entity node in the security graph;
connecting a first principal node from the first cloud computing environment to the entity node; and
connecting a second principal node from the second cloud computing environment to the entity node, in response to determining that the first principal node and the second principal node represent a single entity.

10. The method of claim 9, further comprising:
determining that the first principal node and the second principal node represent a single entity by matching at least an attribute value of the first principal node to a corresponding attribute value of the second principal node.

11. The method of claim 10, wherein the at least an attribute value pertains to any one of: a username, an email address, and a role.

12. A non-transitory computer readable medium having stored thereon instructions for causing a processing circuitry to execute a process for generating a security graph utilizing a unified model based on multiple cloud computing environments, the process comprising:
receiving data from a first cloud computing environment pertaining to: a plurality of resources, a plurality of principals, and a plurality of permissions;
generating for each resource of the plurality of resources a corresponding resource node in the security graph based on the unified model, the corresponding resource node including an identifier of the resource, wherein the resource is a cloud entity deployed in the first cloud computing environment;
generating for each principal of the plurality of principals a corresponding principal node in the security graph based on the unified model, the corresponding principal node including an identifier of the principal, wherein the principal is a cloud entity in the first cloud computing environment that generates a request for an operation in the first cloud computing environment; and
generating a connection between at least a principal node and at least a resource node in the security graph based on the unified model, in response to detecting a permission indicating that a principal corresponding to the at least a principal node can access a resource corresponding to the at least a resource node.

13. A system for generating a security graph utilizing a unified model based on multiple cloud computing environments, comprising:
a processing circuitry; and
a memory, the memory containing instructions that, when executed by the processing circuitry, configure the system to:
receive data from a first cloud computing environment pertaining to: a plurality of resources, a plurality of principals, and a plurality of permissions;
generate for each resource of the plurality of resources a corresponding resource node in the security graph based on the unified model, the corresponding resource node including an identifier of the resource, wherein the resource is a cloud entity deployed in the first cloud computing environment;
generate for each principal of the plurality of principals a corresponding principal node in the security graph based on the unified model, the corresponding principal node including an identifier of the principal, wherein the principal is a cloud entity in the first cloud computing environment that generates a request for an operation in the first cloud computing environment; and
generate a connection between at least a principal node and at least a resource node in the security graph based on the unified model, in response to detecting a permission indicating that a principal corresponding to the at least a principal node can access a resource corresponding to the at least a resource node.

14. The system of claim 13, wherein the memory contains further instructions that when executed by the processing circuitry, further configure the system to:
read at least one text based policy received from the first cloud computing environment, each of the at least one policy indicating at least one permission for the plurality of principals to act on the plurality of resources.

15. The system of claim 13, wherein the memory contains further instructions that when executed by the processing circuitry, further configure the system to:
receive data from a second cloud computing environment pertaining to a plurality of resources and a plurality of principals of the second cloud computing environment, the data including a plurality of identifiers and a plurality of permissions;
generate a resource node for each resource of the plurality of resources, in response to determining that a resource of the second cloud computing environment is not represented in the security graph by a corresponding resource node; and
generating a principal node for each principal of the plurality of principals, in response to determining that a principal of the second cloud computing environment is not represented in the security graph by a corresponding principal node.

16. The system of claim 15, wherein the memory contains further instructions that when executed by the processing circuitry, further configure the system to:

map a resource of the second cloud computing environment to a resource node in the security graph, in response to determining that the resource of the second cloud computing environment is represented in the security graph by the resource node.

17. The system of claim 16, wherein the memory contains further instructions that when executed by the processing circuitry, further configure the system to:

compare an identifier of the resource to an identifier of the resource node; and mapping the resource to the resource node in response to determining that the identifier of the resource is identical to the identifier of the resource node.

18. The system of claim 15, wherein the memory contains further instructions that when executed by the processing circuitry, further configure the system to:

generate an entity node in the security graph;

connect a first principal node from the first cloud computing environment to the entity node; and connect a second principal node from the second cloud computing environment to the entity node, in response to determining that the first principal node and the second principal node represent a single entity.

19. The system of claim 18, wherein the memory contains further instructions that when executed by the processing circuitry, further configure the system to:

determine that the first principal node and the second principal node represent a single entity by matching at least an attribute value of the first principal node to a corresponding attribute value of the second principal node.

20. The system of claim 19, wherein the at least an attribute value pertains to any one of: a username, an email address, and a role.

* * * * *